March 12, 1968  O. D. WINKLE  3,372,970
TRAFFIC LIGHT INDICATOR
Filed Feb. 28, 1964

Oliver D. Winkle
INVENTOR.

United States Patent Office 3,372,970
Patented Mar. 12, 1968

3,372,970
TRAFFIC LIGHT INDICATOR
Oliver D. Winkle, 908 E. Lee St., Tucson, Ariz. 85719
Filed Feb. 28, 1964, Ser. No. 348,078
4 Claims. (Cl. 350—100)

ABSTRACT OF THE DISCLOSURE

An elongated generally cylindrical housing for mounting on the dashboard of a vehicle in generally horizontal position with the housing extending longitudinally of the vehicle and the forward end of the housing disposed closely adjacent the lower marginal edge portion of a forwardly and downwardly inclined windshield of the vehicle, the forward end of the housing being closed and having a circumferentially extending aperture formed in its upper wall portion with a concave rearwardly facing mirror disposed in the forward end of the housing forward of the aperture, a converging lens recessed in the open rear end of the housing and a convex spherical mirror disposed in the housing below the longitudinal center line thereof forward of the concave mirror for reflecting light rays passing downwardly through the viewing aperture in a rearward and downwardly inclined direction forwardly and upwardly onto the concave mirror for subsequent reflection rearwardly through the converging lens.

---

Figure 1:
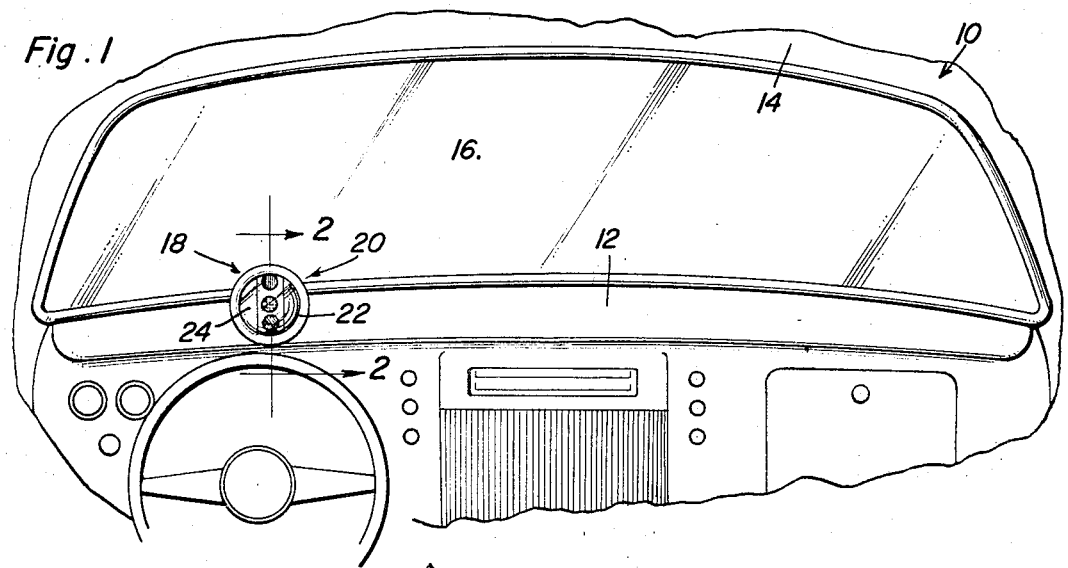

This invention relates to a novel and useful traffic light indicator for vehicles and more specifically to an optical system which may be placed on the upper surface of the dashboard of the vehicle and viewed by the driver of the vehicle to ascertain the color of the traffic light disposed above and slightly forwardly of the vehicle which would ordinarily not be visible to the driver of the vehicle without the driver leaning his head far forwardly and looking up outwardly of the upper portion of the windshield of the vehicle.

The traffic light indicator of the instant invention is somewhat different from conventional forms of traffic light indicators which have been known heretofore. One of the most popular types of indicators previously known utilized the provision of a wedge-shaped lens which was capable of refracting and therefore bending light rays. Although this type of wedge-shaped lens is operable, its characteristics of operation are such that it normally must be positioned at substantially eye level in order that high traffic lights could be viewed therethrough. Not only does the high positioning of a lens of this type result in a safety hazard inasmuch as the forward view of the driver is partially blocked, but the driver, when looking into an elevated lens of this type is necessarily looking toward a bright sky during the daytime or toward oncoming lights at nighttime. Accordingly, it is sometimes difficult to determine the color of a traffic light viewed through the conventional wedge-shaped lens inasmuch as the driver's eyes are automatically reducing the amount of light passing thereinto due to the light background behind the wedge-shaped lens. This inherent operational defect of conventional forms of traffic light indicators utilizing a wedge-shaped lens, when combined with the inherent reduction of the intensity of light passing through such a lens sometimes makes it impossible for the driver of a vehicle to accurately determine the color of an overhead traffic light.

It is accordingly the main object of this invention to provide a traffic light indicator designed to enable the driver of a vehicle to determine the color of an overhead traffic light and to be constructed in such a manner that it may be mounted low on the dashboard of a vehicle and yet still allow the driver of the vehicle to view an overhead traffic light therethrough. In this manner, the driver of a vehicle, when looking through the traffic light indicator of the instant invention, is not required to look toward a light background.

Another object of this invention, in accordance with the immediately preceding object, is to provide a traffic light indicator constructed in a manner so as to be adapted to be operable in substantially all types of conventional motor vehicles.

A final object of this invention to be specifically enumerated herein is to provide a traffic light indicator for vehicles in accordance with the preceding objects which will conform to conventional forms of manufacture, be of simple construction and easy to use so as to provide a device that will be economically feasible, long lasting and relatively trouble-free in operation.

Figure 2:
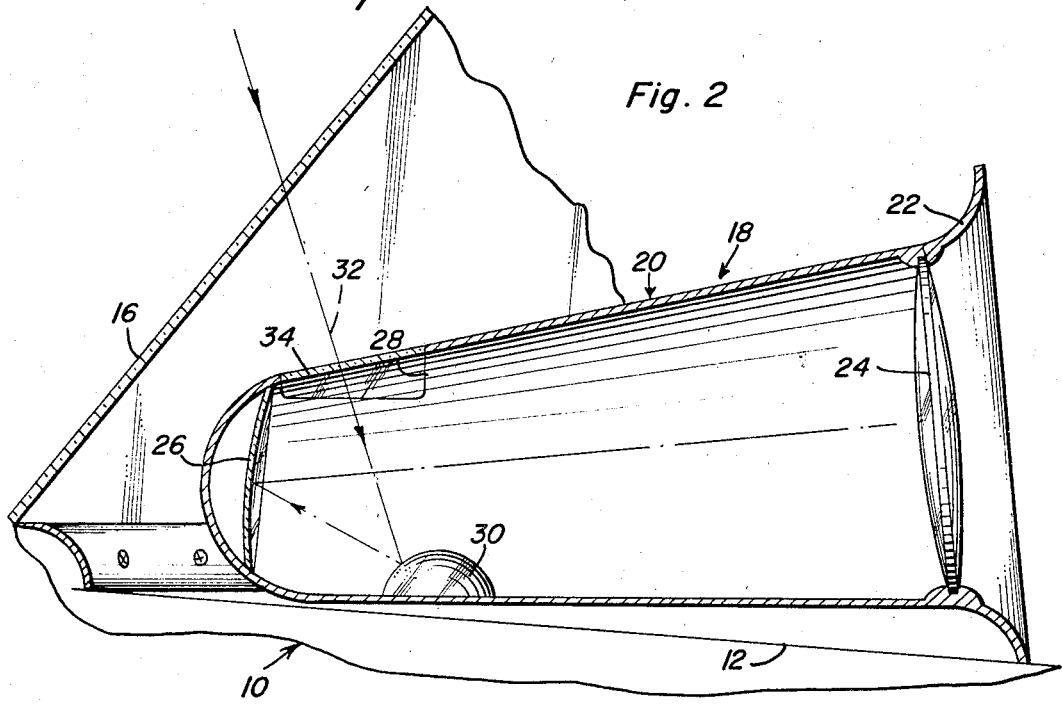

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view of the interior of a conventional form of motor vehicle shown with the traffic light indicator of the instant invention mounted on the dashboard of the vehicle; and FIGURE 2 is a fragmentary enlarged vertical sectional view taken substantially upon the plane indicated by the section line 2—2 of FIGURE 1 and showing the path of light rays from an overhead traffic light as they enter and pass through the traffic light indicator of the instant invention.

Referring now more specifically to the drawings the numeral 10 generally designates a conventional form of motor vehicle which includes a dashboard 12 and a roof 14 between which is defined an opening in which a windshield assembly 16 is mounted in the conventional manner. The traffic light indicator of the instant invention is generally referred to by the reference numeral 18 and may be mounted on the dashboard 12 in any conventional manner.

As can best be seen from FIGURE 2 of the drawings the traffic light indicator includes an elongated and generally cylindrical housing referred to in general by the reference numeral 20. The rear end of the housing 20 is open and flared as at 22 and has a converging lens 24 mounted therein with the principal axis of the lens 24 generally coinciding with the longitudinal centerline of the housing 20.

A rearwardly and slightly downwardly facing concave spherical mirror 26 is mounted in the closed front end of the housing 20 and the housing 20 has a transversely widened and forwardly and upwardly opening aperture 28 formed therein which is disposed immediately rearwardly of the upper portion of the concave spherical mirror 26. A convex spherical mirror 30 is secured to the bottom of the forward end portion of the housing 20 in any convenient manner and is disposed below a line extending between the converging lens 24 and the concave spherical mirror 26. It will be noted that portions of the convex spherical mirror 30 face forwardly and upwardly toward the aperture 28 so as to reflect the light beams or rays 32 emanating from the overhead traffic light (not shown) and passing through the aperture 28 from the exterior of the housing forwardly and upwardly onto the concave spherical mirror 26. In addition, the concave spherical mirror 26 is positioned so as to receive the reflected light rays 32 from the convex mirror 30 and reflect the light rays rearwardly through the housing 20 and the converging lens 24.

It is to be noted that the mirrors 26 and 30 could be plain mirrors although this would limit the field of view through the traffic light indicator 18 and would not enable the driver of the vehicle 10 to view an overhead traffic light disposed to one side of a vertical plane passing through the indicator 18. In addition, the radii of curvatures of the lens 24 and the mirrors 26 may vary according to the magnification of the image of the traffic light desired and the size of the housing 20 and the relative positioning of the lens 24 and the mirrors 26 and 30. However, the radius of curvature of the concave spherical mirror 26 will preferably be considerably greater than twice the distance between the center of curvature of the convex spherical mirror and the concave spherical mirror thereby placing the image of the traffic light (not shown) for viewing through the converging lens 24 a spaced distance behind the concave spherical mirror 26, this image being a virtual image.

The image of the traffic light (not shown) formed by the convex spherical mirror 30 will of course be virtual and diminished and lie somewhere between the center of curvature of the convex spherical mirror and the reflective surface of the convex spherical mirror 30. In addition, the radii of curvature of the remote surfaces of the converging lens 24 will be somewhat greater than twice the distance between the converging lens 24 and the virtual image of the traffic light formed by the concave spherical mirror 26.

In operation, the housing 18 is mounted on the dashboard 12 in order that the path of the light rays reflected from the concave spherical mirror 26 will be in alinement with the normal drive position of the driver of the vehicle so that the driver of the vehicle need only to glance at the indicator 18 to determine the color of the overhead traffic light (not shown). Further, should it be desired, a transparent closure 34 may be provided for the aperture 28 whereby foreign material such as dust and the like may be prevented from entering the housing 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traffic light indicator for vehicles of the type including forwardly and downwardly inclined windshields, said indicator including an elongated generally horizontal housing adapted to be mounted on the dashboard of a vehicle and to extend generally longitudinally of the vehicle with its longitudinal centerline generally coinciding with a line of sight of the driver of said vehicle, said housing including an upper wall portion which is generally semicylindrical in configuration at the forward end portion of said housing and which opens downwardly, said housing being open at its rear end, a converging lens recessed in the rear end of said housing and positioned with its principal axis generally coinciding with said longitudinal centerline, a rearwardly and downwardly facing concave mirror mounted in the forward end of said housing, said upper wall portion having a transversely widened forwardly and upwardly opening aperture formed therein including at least portions thereof disposed rearwardly of said rearwardly facing mirror, and a convex spherical mirror mounted in said housing with its center of curvature disposed rearwardly of a plane disposed normal to said center line and passing through the center of said aperture and said mirror disposed below said center line and facing forwardly and upwardly toward said aperture and said rearwardly facing mirror so as to reflect light passing through said aperture from the exterior of said housing and falling on said convex spherical mirror forwardly and upwardly onto said rearwardly facing mirror for subsequent reflection rearwardly off said rearwardly facing mirror and through said converging lens.

2. The combination of claim 1 wherein the radius of curvature of said concave mirror is greater than twice the distance between the center of curvature of said convex spherical mirror and said concave spherical mirror.

3. The combination of claim 2 wherein the virtual image of said concave mirror lies outside the focal point of said converging lens.

4. The combination of claim 1 wherein said open rear end of said housing and said aperture define the only means for admitting light into said housing.

References Cited

UNITED STATES PATENTS 1,814,667  7/1931  Cowdrey _____ 350—100

FOREIGN PATENTS 866,255  4/1941  France.

JEWELL H. PEDERSEN, *Primary Examiner.*

RONALD L. WIBERT, *Examiner.*